UNITED STATES PATENT OFFICE.

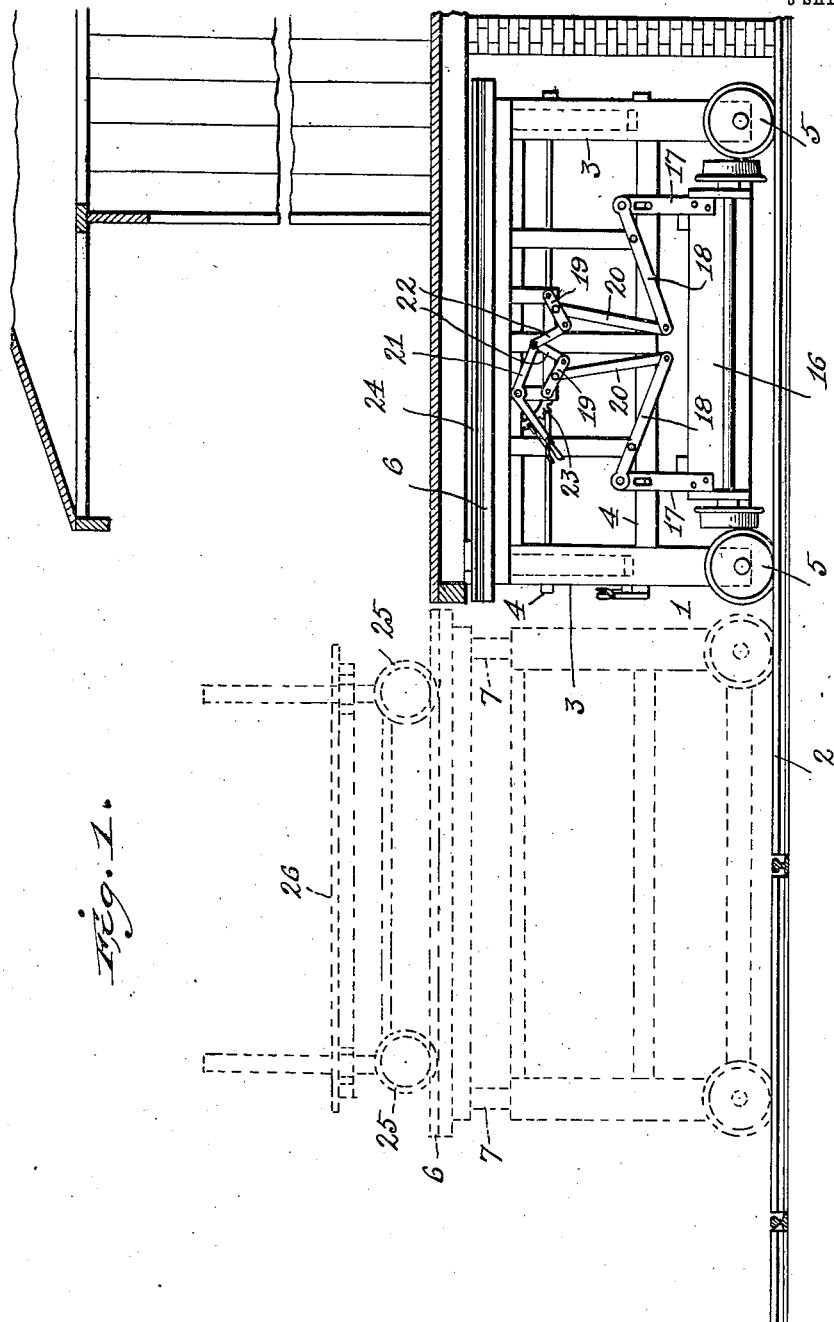

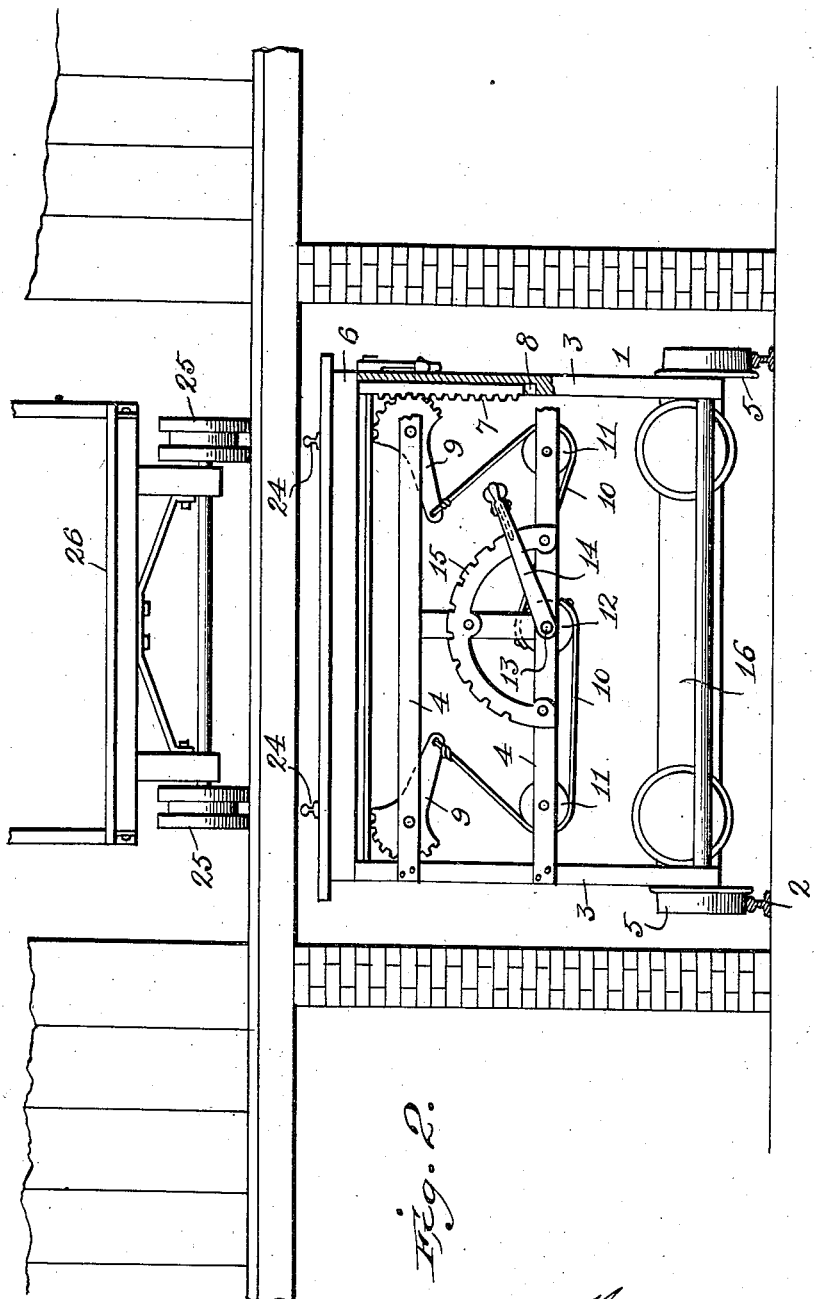

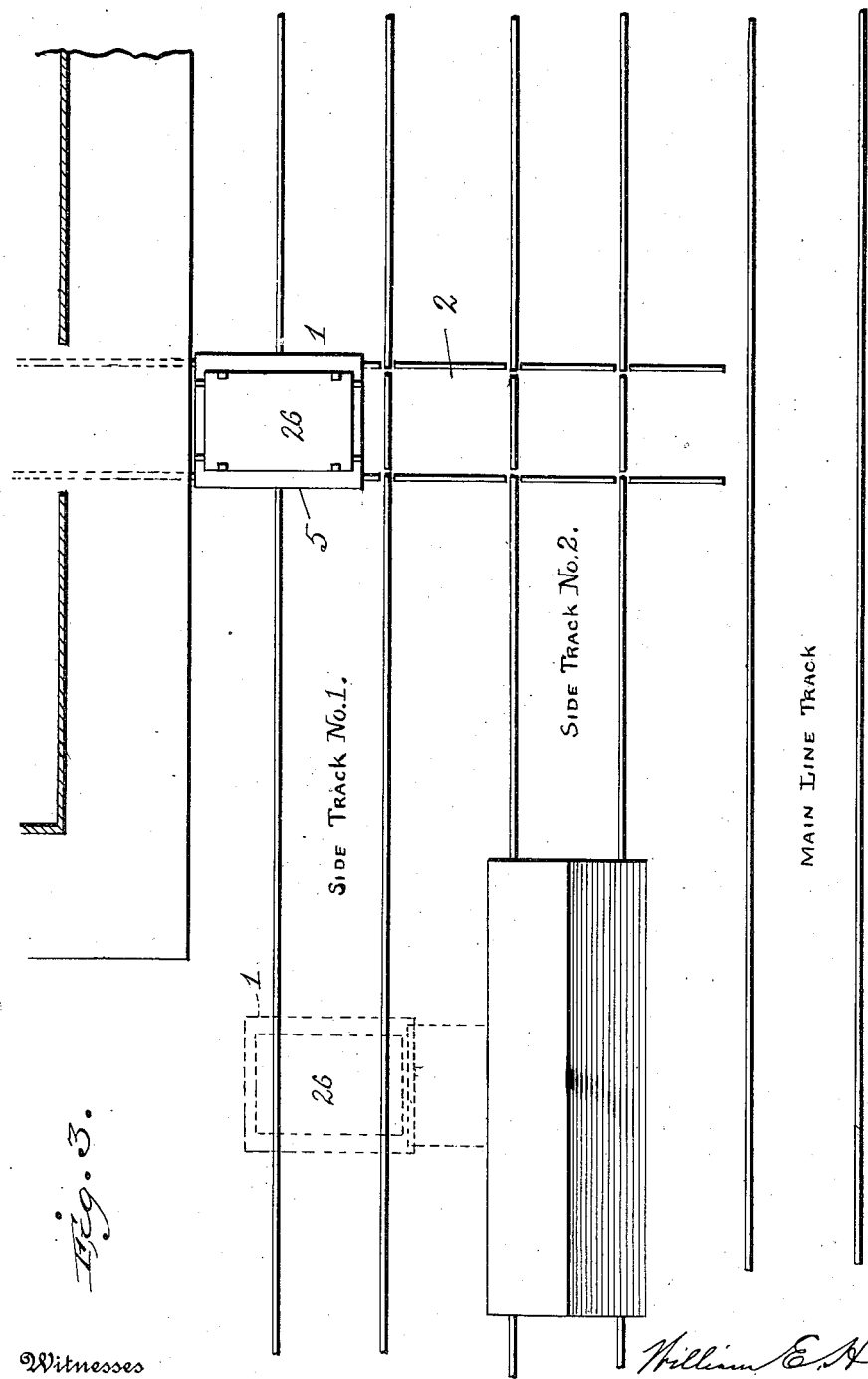

WILLIAM ERASTUS HAM AND ALBERT MOSES COOK, OF MEBANE, NORTH CAROLINA.

LOADING AND UNLOADING DEVICE.

1,017,290.   Specification of Letters Patent.   Patented Feb. 13, 1912.

Application filed May 20, 1911. Serial No. 628,543.

*To all whom it may concern:*

Be it known that we, WILLIAM E. HAM and ALBERT M. COOK, citizens of the United States, and residents of Mebane, in the county of Alamance and State of North Carolina, have invented certain new and useful Improvements in Loading and Unloading Devices, of which the following is a full and clear description, reference being had to the accompanying drawings, in which—

Figure 1 is a side elevation of our improved truck showing it housed beneath the station platform; Fig. 2 is a front elevation, and Fig. 3 is a plan view, showing in dotted lines the position of the truck when loading or unloading.

This invention relates to improvements in loading and unloading devices, and has for its particular object, to provide such a device that is especially adapted for use on railroads for transporting articles to and from the cars to the depot or station. These and other objects hereinafter set forth are attained by the means illustrated in the accompanying drawings.

Similar reference numerals in the several figures designate like parts.

The invention as herewith presented consists of a truck adapted to be housed beneath the station or its platform, and when in use adapted to be moved therefrom on suitable tracks to the side tracks and to and from the cars and station.

In the present embodiment, the invention comprises a main truck 1 adapted to run upon a track 2 which extends a suitable distance beneath the station and out therefrom across as many side tracks as are necessary for any particular station. In the present instance, two side tracks are shown and a main line track, said track 2 crossing both side tracks and extending adjacent to said main line track. Said main truck 1 consists of a suitable frame embodying standards 3, preferably one at each corner, said standards being braced apart by horizontal braces 4, suitable flanged wheels 5 journaled in the frame and adapted to run upon the track 2, and an adjustable top or platform 6, for the purpose hereinafter set forth.

The platform 6 is mounted upon suitable rack-bars 7, which are adapted to move vertically in grooves 8 in the standards 3, (as shown in Fig. 2), and means are provided for moving and locking said rack bars and platform in adjusted position. Said means comprises levers 9 pivoted intermediate their ends to the frame of the main truck and provided at one end with segment gears adapted to engage the rack bars 7, and having connected at their other ends cables 10, which pass around idle pulleys 11, journaled in said frame, and then connected to the drums or pulleys 12 fixed upon a rock shaft 13, also journaled in said frame. Said rockshaft 13 is provided with an operating handle 14 having a catch thereon adapted to engage the notched segment 15. Thus when the shaft 13 is rocked the cables 10 are wound around the drums 12 thereby operating the levers 9, which through their engagement with the racks 7 elevate the platform.

As before stated, the wheels 5 of the main truck 1 are adapted to run upon the track 2, and to adapt said truck 1 to the side tracks which extend at right angles to said track 2, the following means are provided. Carried by the main truck 1 and suspended from the frame thereof above the tracks when said main truck is resting upon the track 2, is an auxiliary truck 16 which is of the same gage of the side tracks, adapted to be placed in engagement therewith, and to lift bodily the main truck 1 out of engagement with the track 2, whereby the truck can be run upon said side tracks. To accomplish this, said auxiliary truck is provided with standards 17 slidably engaged with the frame of the truck 1, which have their upper ends connected to the short arms of the pivoted levers 18, the longer arms of which being connected to pivoted levers 19 by links 20, said levers 19 being pivoted at one of their ends and having their other ends connected to one end of pivoted anglelever 21 by the links 22, the other end of said angle lever forming an operating handle and provided with a catch adapted to engage the toothed segment 23. Thus, through this system of levers the auxiliary truck can be raised or lowered, and when lowered upon the side tracks sufficient leverage is obtained to force the wheels of the main truck out of engagement with the track 2 and above said side tracks. The platform 6 of the main truck 1 is provided with rails 24 adapted to support and guide the doubleflanged wheels 25 of the station truck 26, said flanges of the wheels 25 being of sufficient width to prevent cutting or marking of the floor of the station.

In operation the main and auxiliary trucks are housed beneath the station or its platform as shown in full lines in Fig. 1, it may be said in a closed position, that is, with the platform 6 lowered to its lowest position. Assuming that a car, in the position shown in Fig. 3 located upon sidetrack No. 2, is to be loaded or unloaded, the main truck is pushed or drawn from beneath the housing and its platform elevated to the level of the station platform for the reception of the station truck, as shown in dotted lines in Fig. 1. The apparatus is then advanced until the auxiliary truck wheels are in alinement with the rails of the side-track No. 1, when said auxiliary truck is lowered, the main truck lifted, the apparatus is shifted upon the side-track No. 1, to a position opposite the car. For convenience a running board can be used between the car and truck. In returning to the station the operation is reversed.

From the above description it will be observed that cars positioned away from the depot platform can be loaded or unloaded as readily as when adjacent thereto, the platform of the truck being adjusted to the level of the floor of the car and the station platform, facilitates the easy handling of the articles to be transferred.

Having thus described our invention, what we claim as new and desire to secure by Letters Patent, is—

1. In an apparatus of the class set forth, a main truck provided with a set of wheels, an auxiliary set of wheels mounted on the main truck and arranged to run at right angles to the wheels of the main truck, means for elevating the main truck and wheels and relatively lowering the auxiliary set of wheels, whereby the truck may be adjusted to run on tracks at right angles to each other, a platform supported on the main truck so as to be raised and lowered therewith, and means for raising and lowering this platform independent of the main truck, said means embodying devices for locking the platform in its adjusted position.

2. A freight and baggage transfer apparatus for railway stations, consisting of an auxiliary track extending from a point under the station platform across the adjacent railway tracks, and an apparatus adapted to run on said main tracks and on said auxiliary track and be housed under the station platform, said apparatus consisting of a main truck provided with a set of wheels adapted to run only upon the auxiliary track, an auxiliary set of truck wheels arranged at right angles to the aforesaid truck wheels and adapted to run only on the tracks of the railway, means for lowering the auxiliary wheels into operative position and raising the main truck and its wheels, a platform supported on the main truck and means for raising and lowering said platform independently of both sets of truck wheels, for the purposes set forth.

In testimony whereof we hereunto affix our signatures in the presence of two witnesses this 19th day of May 1911.

WILLIAM ERASTUS HAM.
ALBERT MOSES COOK.

Witnesses:
R. H. TYSON,
U. S. RAY.